US011368847B2

United States Patent
Chen et al.

(10) Patent No.: US 11,368,847 B2
(45) Date of Patent: Jun. 21, 2022

(54) NETWORKING BEHAVIOR DETECTOR AND NETWORKING BEHAVIOR DETECTION METHOD THEREOF FOR INDOOR SPACE

(71) Applicant: Institute For Information Industry, Taipei (TW)

(72) Inventors: Chih-Wei Chen, Taipei (TW); Chia-Min Lai, Taipei (TW); Wei-Chen Tou, Taipei (TW)

(73) Assignee: INSTITUTE FOR INFORMATION INDUSTRY, Taipei (TW)

(*) Notice: Subject to any disclaimer, the term of this patent is extended or adjusted under 35 U.S.C. 154(b) by 448 days.

(21) Appl. No.: 16/702,421

(22) Filed: Dec. 3, 2019

(65) Prior Publication Data

US 2021/0144556 A1 May 13, 2021

(30) Foreign Application Priority Data

Nov. 11, 2019 (TW) ................................. 108140847

(51) Int. Cl.
*H04W 12/126* (2021.01)
*G06N 3/04* (2006.01)
(Continued)

(52) U.S. Cl.
CPC ...... *H04W 12/126* (2021.01); *G01R 29/0807* (2013.01); *G01R 29/0892* (2013.01);
(Continued)

(58) Field of Classification Search
CPC ... H04W 12/126; H04W 12/47; H04W 84/12; H04W 12/128; H04W 12/68;
(Continued)

(56) References Cited

U.S. PATENT DOCUMENTS

2003/0088412 A1  5/2003  Shetty et al.
2006/0135188 A1  6/2006  Murty et al.
(Continued)

FOREIGN PATENT DOCUMENTS

| CN | 108235359 A | 6/2018 |
| CN | 109657390 A | 4/2019 |
| CN | 109743314 A | 5/2019 |

OTHER PUBLICATIONS

Office Action to the corresponding Taiwan Patent Application rendered by the Taiwan Intellectual Property Office (TIPO) dated Jul. 17, 2020, 11 pages (including English translation).

*Primary Examiner* — Marcos L Torres
(74) *Attorney, Agent, or Firm* — Li & Cai Intellectual Property Office

(57) ABSTRACT

A networking behavior detector and a networking behavior detection method thereof for an indoor space are provided. The networking behavior detector receives a plurality of radio frequency (RF) signals in the indoor space and converts the RF signals to a plurality of digital signals. Next, the networking behavior detector calculates an energy value of each digital signal and filters out the digital signal, the energy value of which is smaller than a threshold, of the digital signals to generate an analysis signal. Finally, the networking behavior detector retrieves a plurality of energy feature values of each analysis signal to generate a feature datum, and analyzes the feature data through an identification model to generate an identification result. The identification result corresponds to one of a plurality of networking behaviors.

18 Claims, 14 Drawing Sheets

(51) Int. Cl.
*G06N 3/08* (2006.01)
*G01R 29/08* (2006.01)
*H04W 12/47* (2021.01)
*H04W 84/12* (2009.01)

(52) U.S. Cl.
CPC ................. *G06N 3/04* (2013.01); *G06N 3/08* (2013.01); *H04W 12/47* (2021.01); *H04W 84/12* (2013.01)

(58) Field of Classification Search
CPC ............. H04W 12/121; G01R 29/0807; G01R 29/0892; G06N 3/04; G06N 3/08; G06N 20/00; G06N 3/0454
See application file for complete search history.

(56) References Cited

U.S. PATENT DOCUMENTS

| | | | | |
|---|---|---|---|---|
| 2015/0161386 A1* | 6/2015 | Gupta | ...................... | G06N 5/04 726/22 |
| 2019/0014137 A1* | 1/2019 | Du | ...................... | G06N 3/0427 |

\* cited by examiner

NETWORKING BEHAVIOR DETECTOR AND NETWORKING BEHAVIOR DETECTION METHOD THEREOF FOR INDOOR SPACE

PRIORITY

This application claims priority to Taiwan Patent Application No. 108140847 filed on Nov. 11, 2019, which is hereby incorporated by reference in its entirety.

FIELD

The present invention relates to a networking behavior detector and a networking behavior detection method thereof for an indoor space. Specifically, the networking behavior detector of the present invention analyzes radio frequency (RF) signals in an indoor space to detect whether there is a forbidden wireless networking behavior in the indoor space.

BACKGROUND

With the rapid development of the wireless communication technology, various applications of wireless communication have become ubiquitous in people's life, and demands of people for wireless communication are also increasing day by day. With the popularization of wireless communication devices, it is easier to share and distribute information and data. However, in order to avoid leakage of business secrets or company data, most enterprises prohibit the persons entering the enterprise buildings from using the cameras of mobile phones or notebook computers, and even create an isolation space which only provides a wired network.

The isolation space with the wired network can effectively control network access and data transmission. However, even if no wireless network (e.g., Wi-Fi network) is provided inside the enterprise buildings, it is difficult for the enterprises to indeed isolate the wireless networks provided by buildings or public facilities around the enterprise buildings. Therefore, ill-intentioned persons entering the enterprise buildings may still transmit information or data to other places through external wireless networks.

Accordingly, an urgent need exists in the art to provide a networking behavior detection mechanism to detect whether there is a forbidden wireless networking behavior in an indoor space.

SUMMARY

An objective is to provide a networking behavior detection mechanism, which detects whether there is a forbidden wireless networking behavior by analyzing RF signals in an indoor space. Accordingly, the networking behavior detection mechanism can discover the forbidden wireless networking behavior immediately to further take appropriate actions to prevent leakage of information or data.

Provided is a networking behavior detector for an indoor space, which comprises a radio frequency (RF) receiver and a processor. The processor is electrically connected to the RF receiver and is configured to perform the following operations: receiving a plurality of radio frequency (RF) signals in the indoor space via the RF receiver; converting the RF signals into a plurality of digital signals; calculating an energy value of each of the digital signals; filtering out the digital signal, of which the energy value is smaller than a threshold, among the digital signals to generate a plurality of analysis signals; retrieving a plurality of energy feature values of each of the analysis signals to generate a feature datum; and analyzing the feature datum via an identification model to generate an identification result, wherein the identification result corresponds to one of a plurality of networking behaviors.

Also provided is a networking behavior detection method for a networking behavior detector. The networking behavior detector is installed in an indoor space. The networking behavior detector comprises a RF receiver and a processor. The networking behavior detection method is executed by the processor and comprises the following steps: receiving a plurality of RF signals in the indoor space via the RF receiver; converting the RF signals into a plurality of digital signals; calculating an energy value of each of the digital signals; filtering out a digital signal, of which the energy value is smaller than a threshold, among the digital signals to generate a plurality of analysis signals; retrieving a plurality of energy feature values of each of the analysis signals to generate a feature datum; and analyzing the feature datum through an identification model to generate an identification result, wherein the identification result corresponds to one of a plurality of networking behaviors.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof, and these example embodiments are not intended to limit the present invention to any particular environment, example, embodiment, applications or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
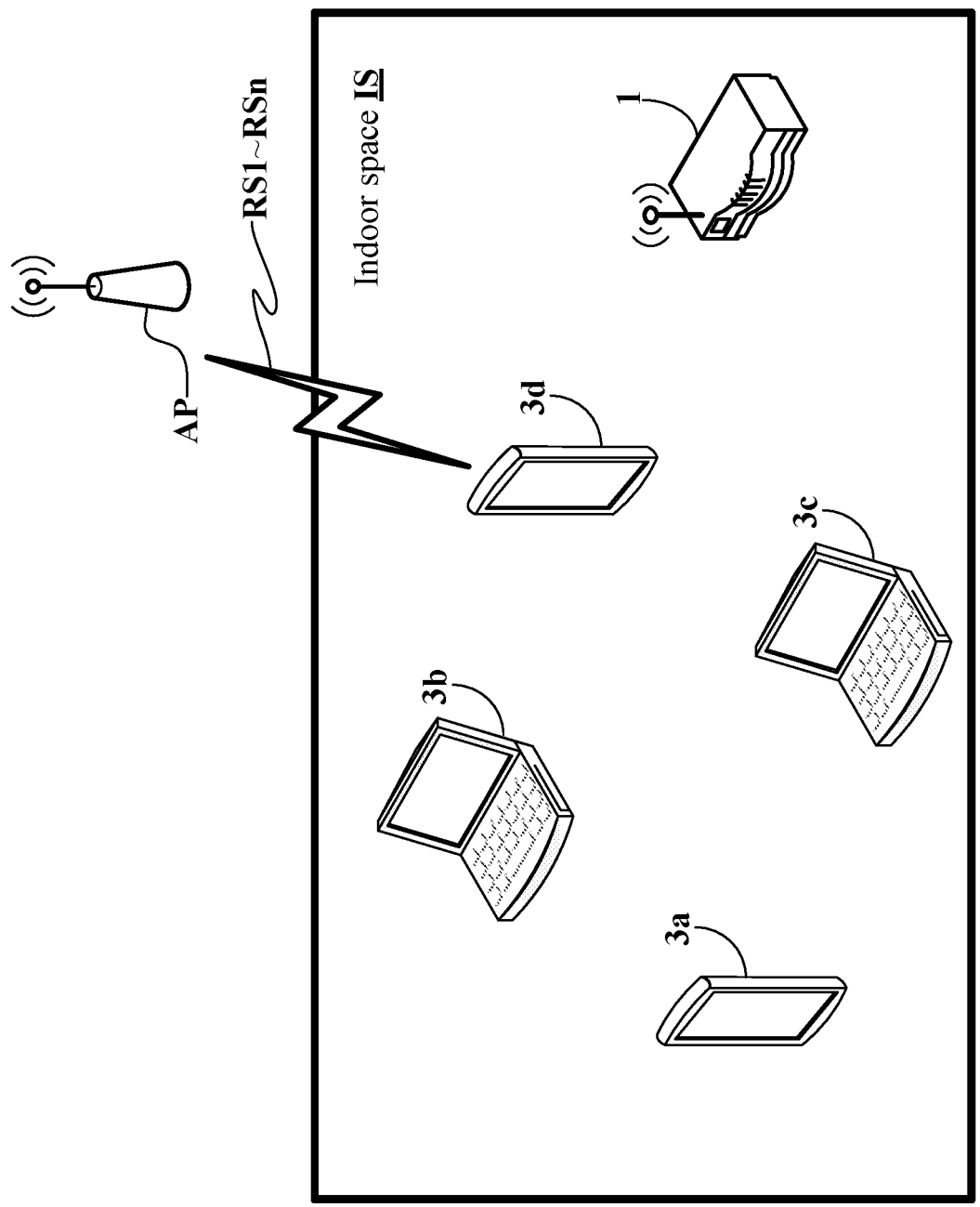
FIG. 1 depicts an implementation scenario of the networking behavior detector 1 according to the present invention.

Please refer to FIG. 1 for the first embodiment of the present invention. FIG. 1 depicts an implementation scenario of a networking behavior detector 1 of the present invention. The networking behavior detector 1 is adapted for use in an indoor space IS, especially an indoor space that only provides wired network connection. For example, the indoor space IS may be a conference room inside an enterprise building, and in order to prevent visitors or enterprise employees from leaking conference information or data, the conference room only provides wired network connection to make it convenient for the enterprise to control network access and data transmission.

Although the indoor space IS only provides wired network connection, the user equipments of the visitors or enterprise employees may still connect to the access point AP if the surrounding environment provides a wireless network (e.g., the wireless network provided by the access point AP belonging to a surrounding building or a public facility network). For example, there are user equipments 3a, 3b, 3c and 3d in the indoor space IS, and the user equipment 3d is connected to the access point AP. The access point AP provides a wireless local area network (e.g., Wi-Fi network), and each of the user equipments 3a, 3b, 3c and 3d may be a smart phone, a tablet, a laptop or any user equipment with the Wi-Fi connection function.

To detect the networking behavior of the user equipment 3d connecting to the access point AP, the networking behavior detector 1 of the present invention is installed in the indoor space IS to receive a plurality of RF signals RS1-RSn in the indoor space IS, where n is a positive integer. In other words, the networking behavior detector 1 measures signals on specific frequency bands in the indoor space IS. For example, as shall be appreciated by those of ordinary skill in the art, the Wi-Fi network has a plurality of channels in the range of 2.4G frequency bands, e.g, 11 channels, and each channel has a bandwidth of 20 MHz. The networking behavior detector 1 may measure each of the channels. In addition, as shall be appreciated by those of ordinary skill in the art, the networking behavior detector 1 may also be used to measure other ranges of frequency bands of the Wi-Fi networks (e.g., the range of 5G frequency bands) or RF signals of other wireless network systems, and this will not be further illustrated herein.

Figure 2:
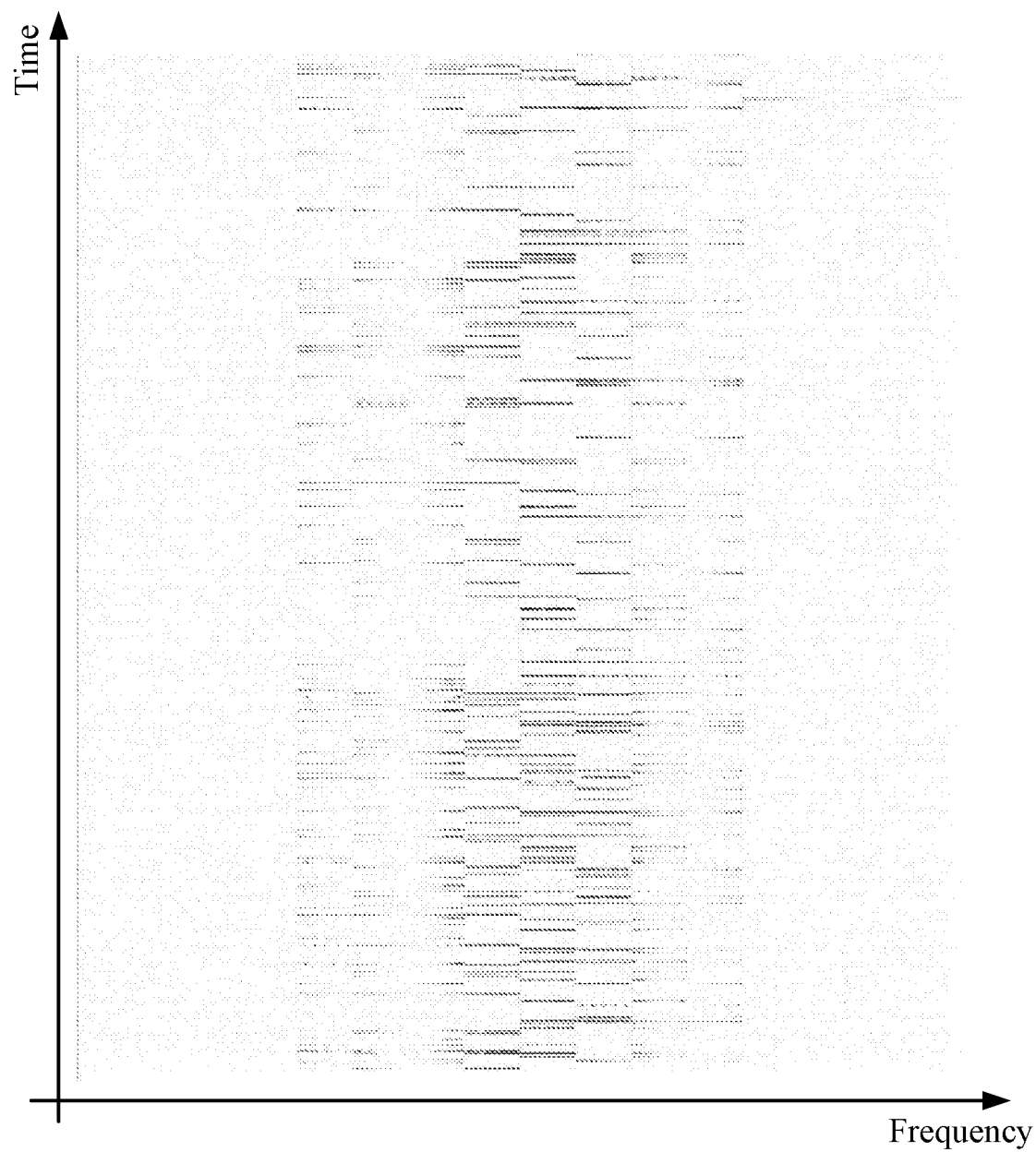
FIG. 2 is a measurement result when the user equipment 3d transmits a video through an access point AP.
Figure 3:
FIG. 3 is a measurement result when the user equipment 3d transmits a photo through the access point AP.
Figure 4:
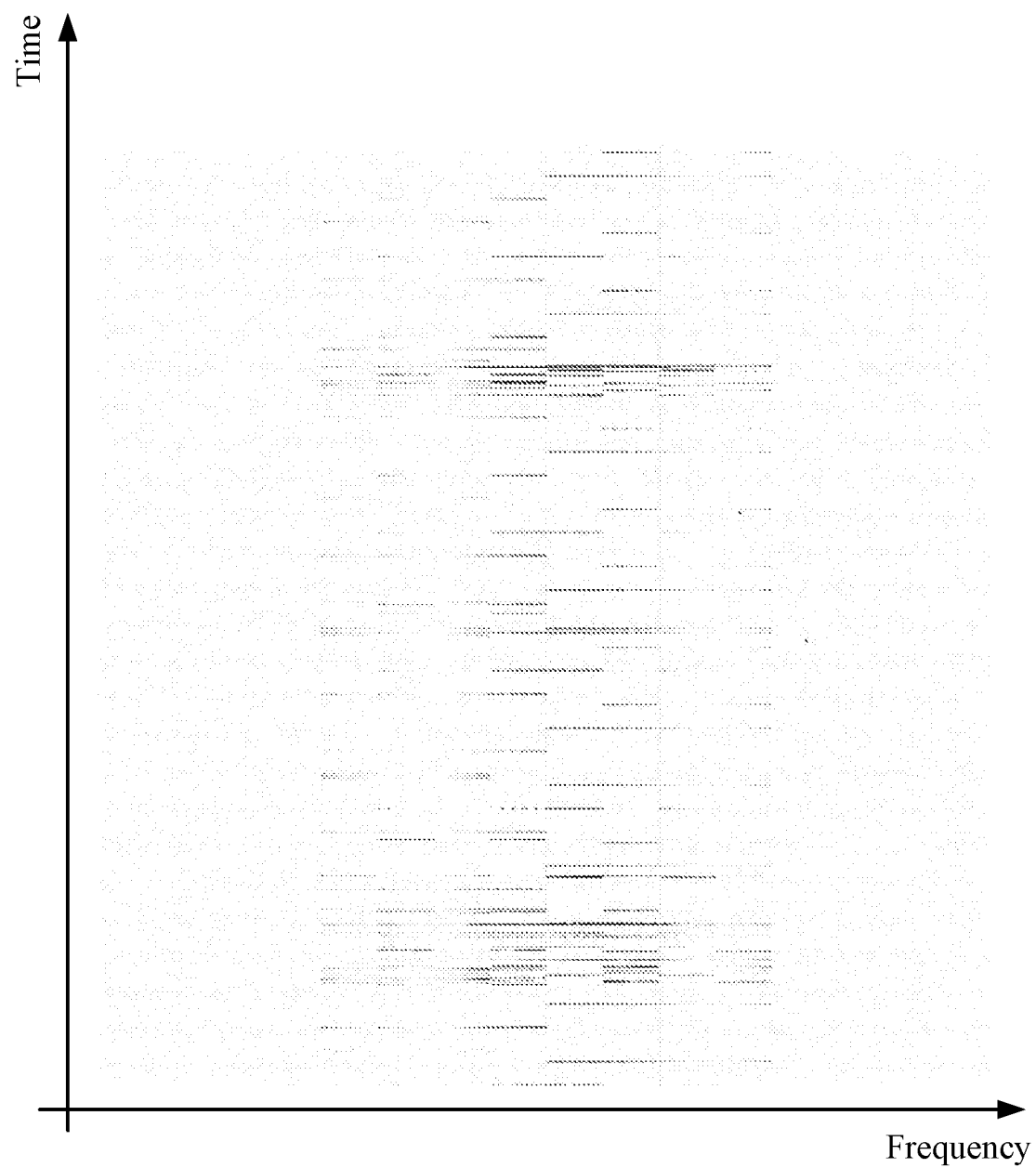
FIG. 4 is a measurement result when the user equipment 3d receives an online video through the access point AP.
Figure 5:
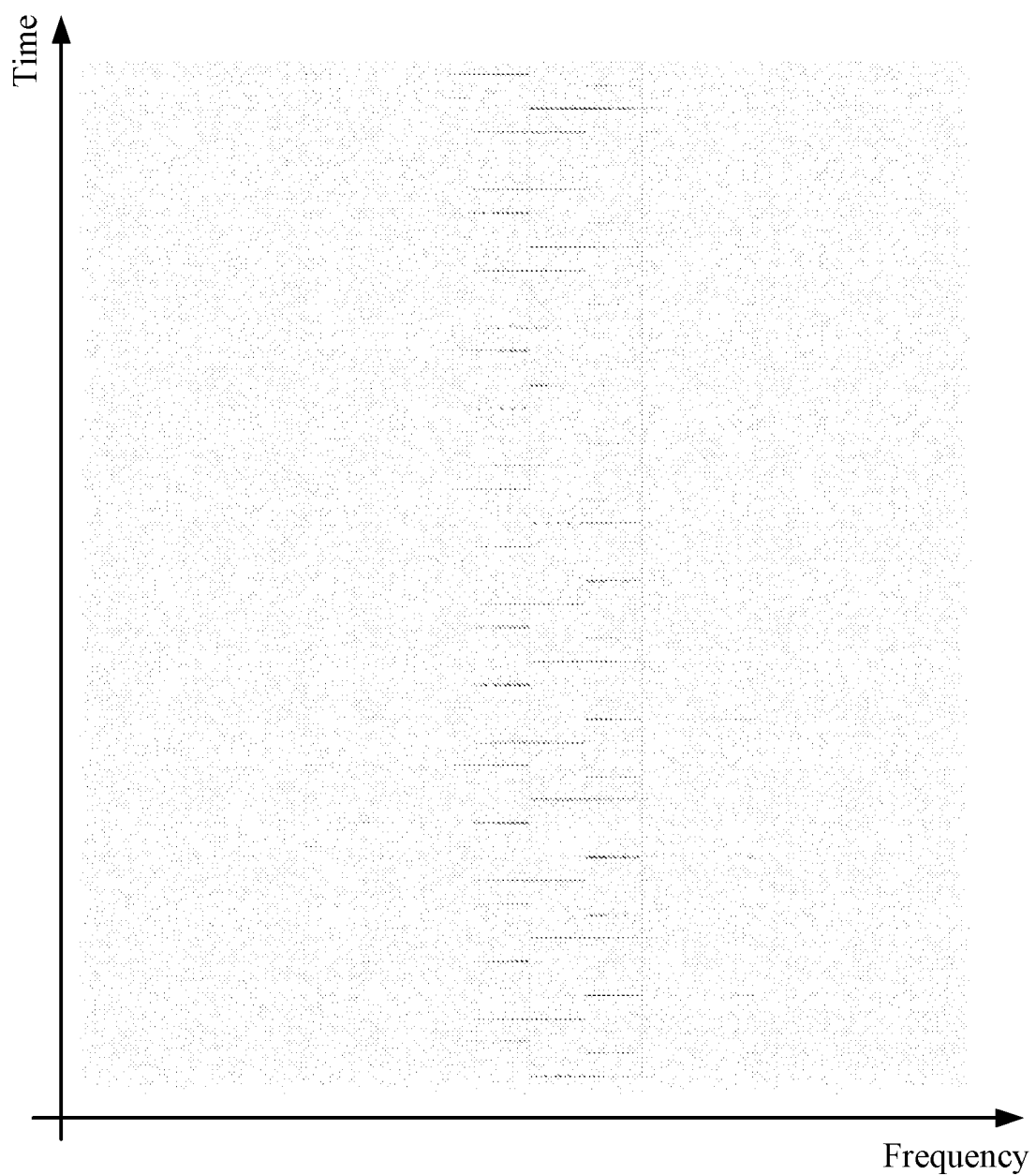
FIG. 5 is a measurement result when the user equipment 3d does not transmit or receive any data through the access point AP.

In this embodiment, it is assumed that only the user equipment 3d in the indoor space IS is using the Wi-Fi function and is connected to the access point AP. FIG. 2 to FIG. 5 show measurement results measured by the networking behavior detector 1 on one of the channels, wherein the horizontal axis is frequency and the vertical axis is time. FIG. 2 is a measurement result when the user equipment 3d transmits a video through the access point AP. FIG. 3 is a measurement result when the user equipment 3d transmits a photo through the access point AP. FIG. 4 is a measurement result when the user equipment 3d receives an online video (e.g., watches YouTube videos) through the access point AP. FIG. 5 is a measurement result when the user equipment 3d does not transmit or receive any data through the access point AP. It shall be appreciated that, in FIG. 5, RF signals measured by the networking behavior detector 1 are broadcast signals transmitted by the access point AP. As can be found from FIG. 2 to FIG. 5, RF signals corresponding to different networking behaviors have different transmission patterns, and these transmission patterns have obvious differences.

Figure 6A:
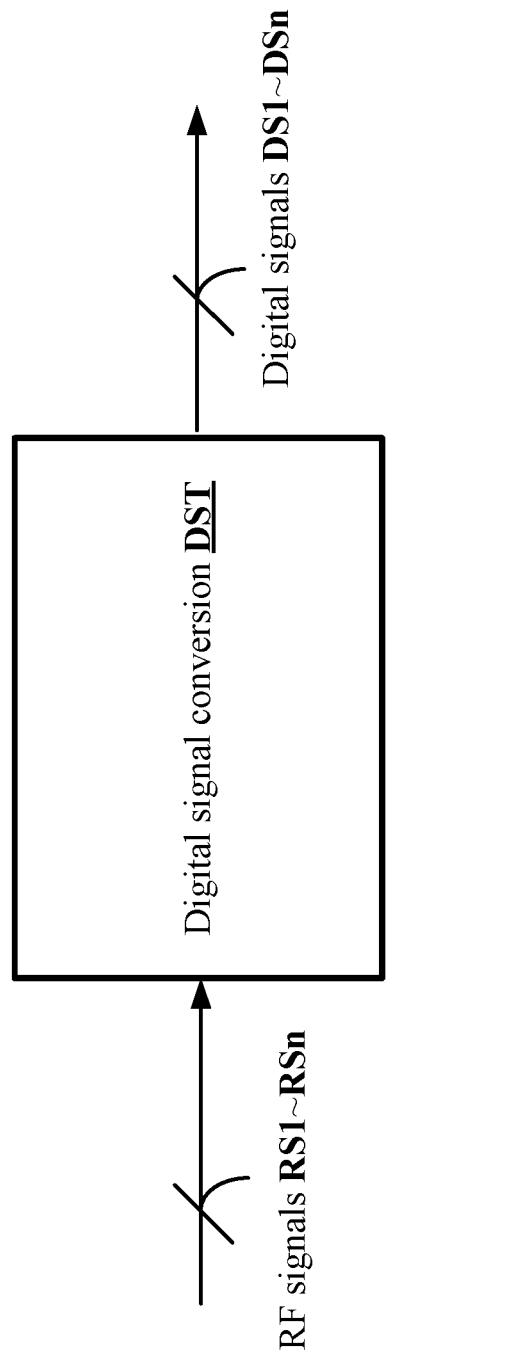
FIG. 6A depicts that the networking behavior detector 1 performs the digital signal conversion DST to convert the measured RF signals RS1-RSn into the digital signals DS1-DSn.
Figure 6B:
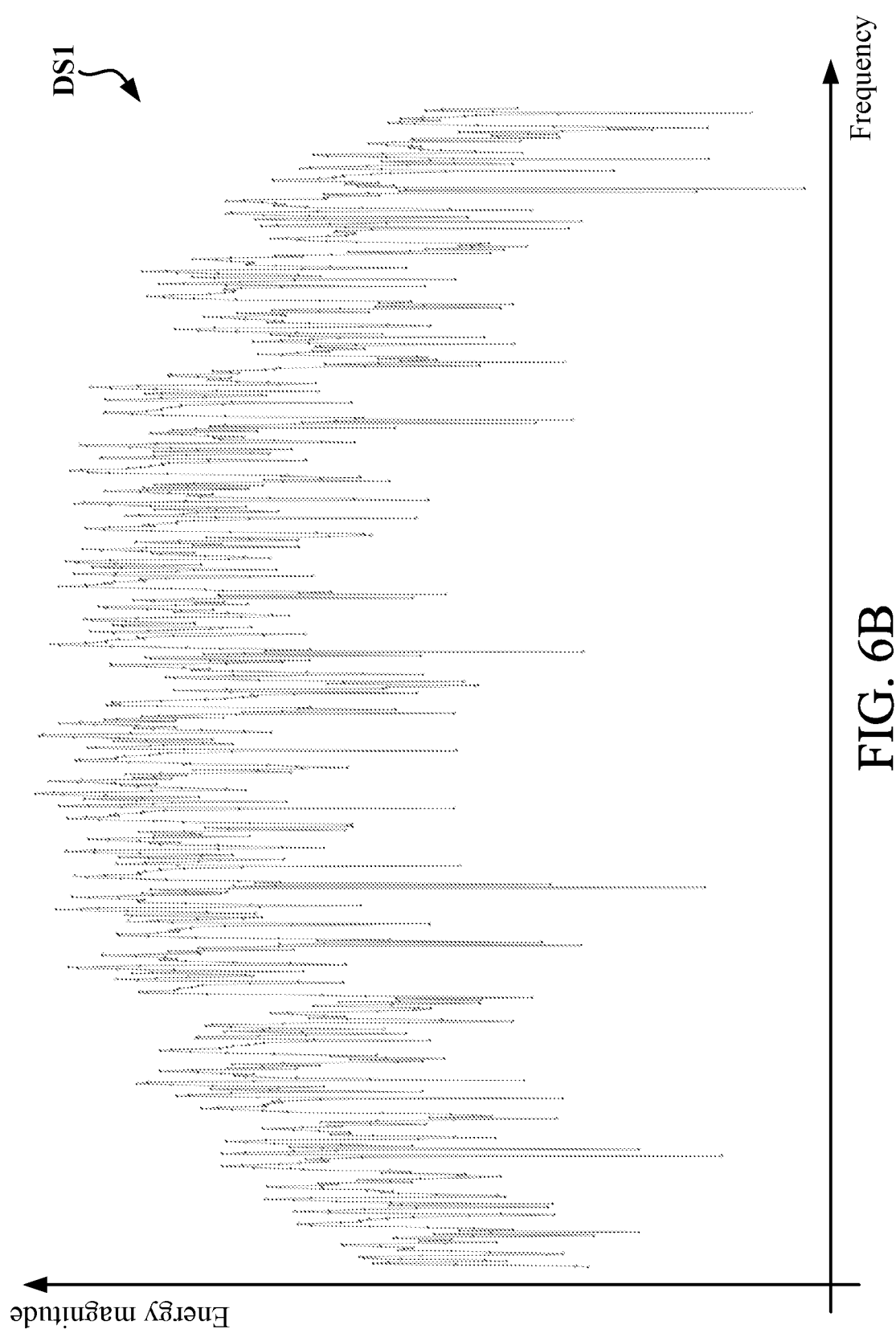
FIG. 6B is a schematic view of the digital signal DS1.

In this embodiment, each of the RF signals RS1-RSn refers to a RF signal on a channel in a unit time interval, and the unit time interval may be a time length of an orthogonal frequency-division multiplexing (OFDM) symbol. Next, the networking behavior detector 1 performs digital signal conversion DST to convert the measured RF signals RS1-RSn into a plurality of digital signals DS1-DSn, as shown in FIG. 6A. For example, the digital signal DS1 may be as shown in FIG. 6B, wherein the horizontal axis is frequency and the vertical axis is energy magnitude (at scales of dB). The process of performing the digital signal conversion DST by the networking behavior detector 1 is to perform sampling on the RF signal RS1 in the time domain and perform signal processing of 1024-point Discrete Fourier Transform (DFT) to generate the digital signal DS1.

Figure 7:
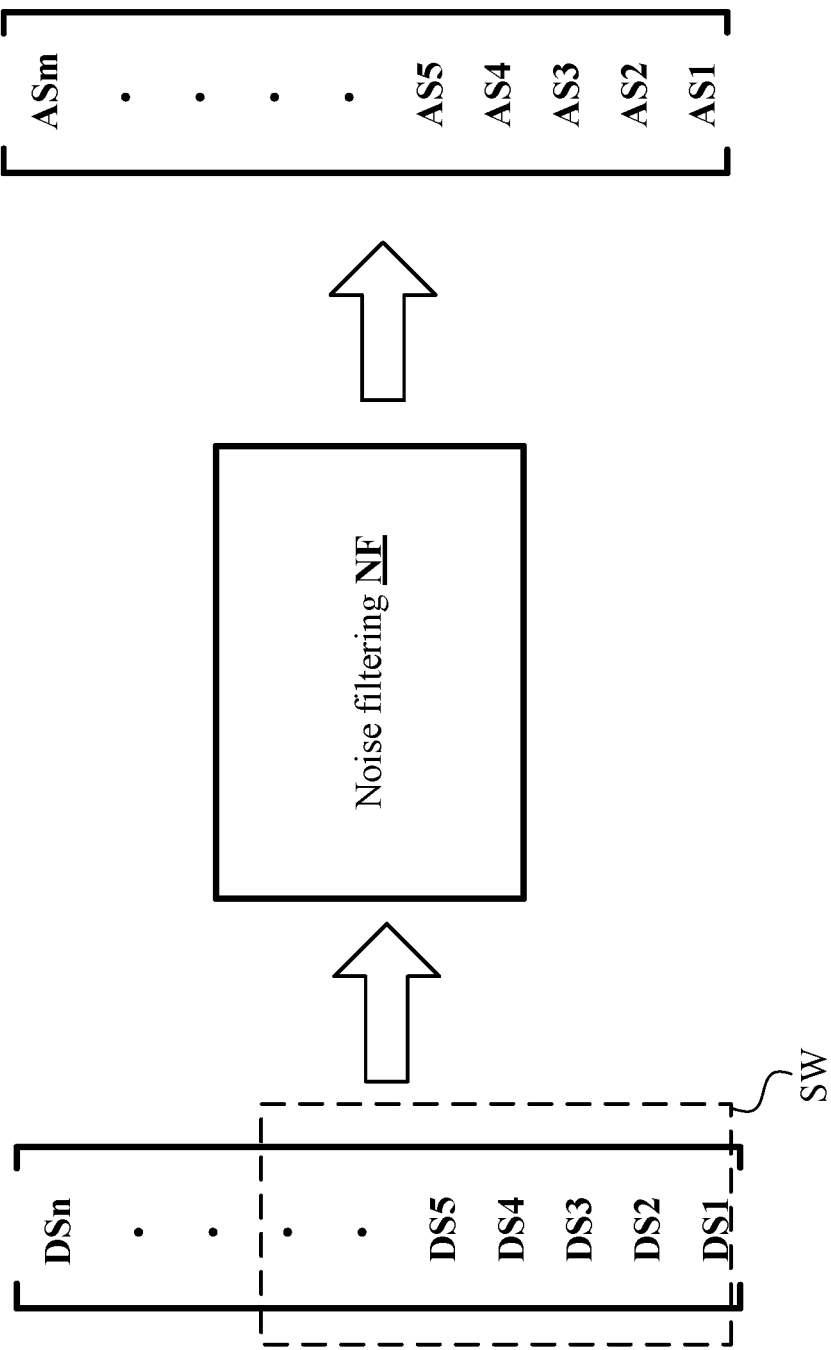
FIG. 7 depicts that the networking behavior detector 1 performs the noise filtering NF on the digital signals DS1-DSn.

For convenience of description, FIG. 7 shows the digital signals DS1-DSn in a matrix form. Each of the digital signals DS1-DSn may be represented by a vector of a dimension of 1×1024. Thereafter, the networking behavior detector 1 calculates the energy value of each of the digital signals DS1-DSn (e.g., an average value of total elements of each vector). Next, the networking behavior detector 1 performs noise filtering NF on the digital signals DS1-DSn to filter out the digital signals with only noise or the digital signals with lower energy levels. Understandably, filtering out the digital signals with only noise can reduce the amount of data to be analyzed subsequently, while filtering out the digital signal with lower energy levels can exclude the signals transmitted or received by the user equipment which is not located in the indoor space IS.

Specifically, the networking behavior detector 1 filters out the digital signal, of which the energy value is smaller than a threshold, among the digital signals DS1-DSn to generate a plurality of analysis signals AS1-ASm, where m is a positive integer and is less than n. The threshold is set to filter out the digital signals with only noise or the digital signals with lower energy levels. Thus, as shall be appreciated by those of ordinary skill in the art, the value of the threshold is related to the space size of the indoor space IS, and the threshold is set appropriately depending on the space size of the indoor space IS in practice. The above-mentioned calculation of the energy value of each of the digital signals DS1-DSn by the networking behavior detector 1 is to calculate the average energy value over a plurality of subcarriers of each of the digital signals DS1-DSn, the maximum energy peak value of the subcarriers of each of the digital signals DS1-DSn or other values that may represent the energy value of the digital signals DS1-DSn, and the present invention is not limited thereto.

The networking behavior detector 1 may perform noise filtering NF on W digital signals in batches based on a sliding window SW, i.e., perform noise filtering NF on the first digital signal to the Wth digital signal, then perform noise filtering NF on the (W+1)th digital signal to the (2W)th digital signal, and so on, until a preset number of analysis signals are obtained, e.g., m analysis signals AS1-ASm are collected. W is a positive integer and the value thereof is determined based on the length of the sliding window SW. For example, the sliding window SW may be 1 millisecond (ms) and m may be 100. Therefore, 100 analysis signals AS1-AS100 may be collected by the networking behavior detector 1.

The following description takes the case where 100 analysis signals AS1-AS100 are collected by the networking behavior detector 1 as an example for illustration. After obtaining 100 analysis signals AS1-AS100, the networking behavior detector 1 retrieves a plurality of energy feature values of each of the analysis signals AS1-AS100 to generate a feature datum FD. The energy feature values may include at least two of a maximum, a minimum, a median, a mean, a standard deviation, and a sum, but are not limited thereto.

Figure 8:
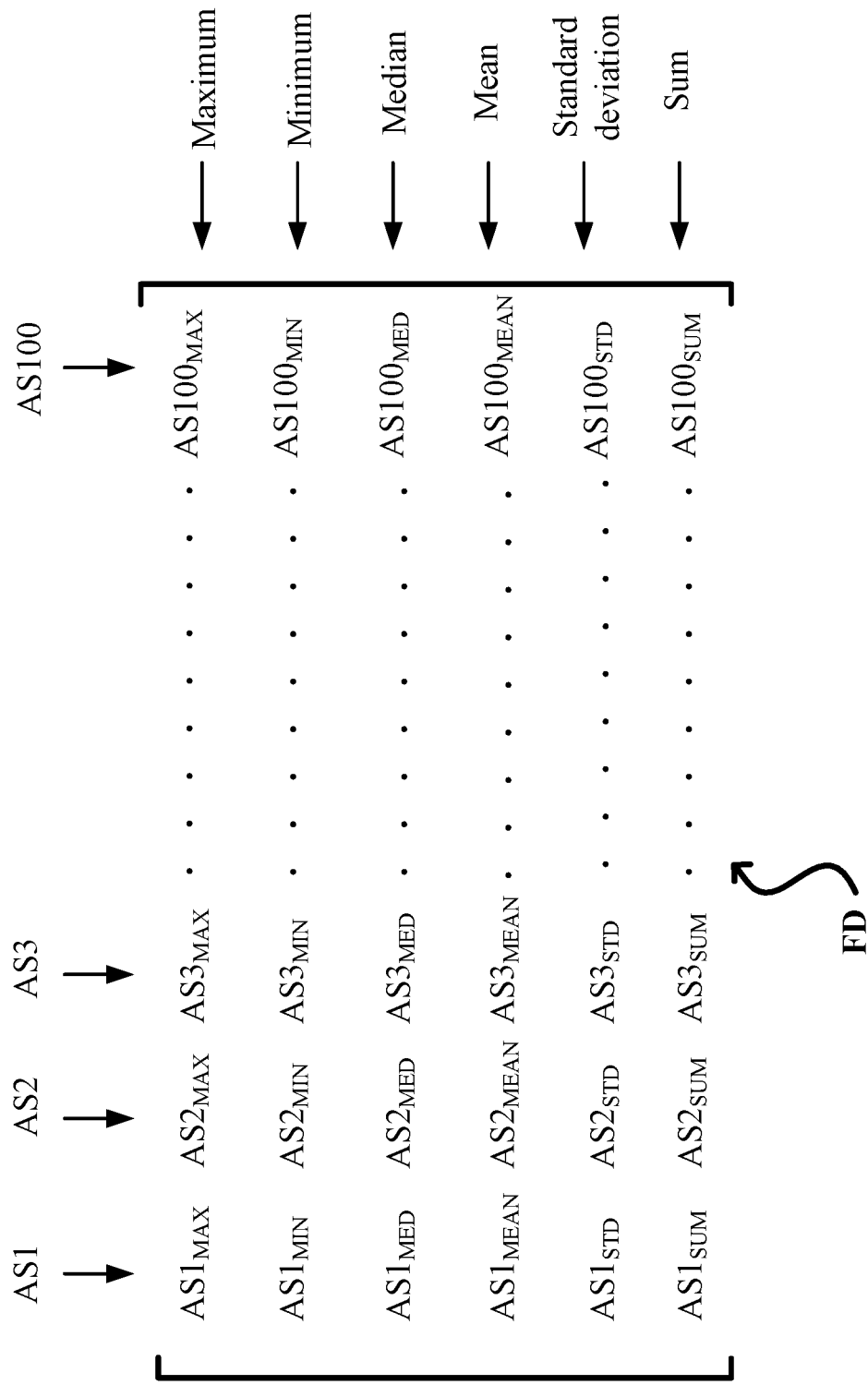
FIG. 8 is a schematic view of the feature datum FD.

As shown in FIG. 8, the feature datum FD includes the energy feature values of each of the analysis signals AS1-AS100. In this exemplary example, the energy feature values include a maximum, a minimum, a median, a mean, a standard deviation and a sum as examples. The maximum $AS1_{MAX}$, the minimum $AS1_{MIN}$, the median $AS1_{MED}$, the mean $AS1_{MEAN}$, the standard deviation $AS1_{STD}$ and the sum $AS1_{SUM}$ are obtained from the analysis signal AS1. The maximum $AS2_{MAX}$, the minimum $AS2_{MIN}$, the median $AS2_{MED}$, the mean $AS2_{MEAN}$, the standard deviation $AS2_{STD}$ and the sum $AS2_{SUM}$ are obtained from the analysis signal AS2. The maximum $AS3_{MAX}$, the minimum $AS3_{MIN}$, the median $AS3_{MED}$, the mean $AS3_{MEAN}$, the standard deviation $AS3_{STD}$ and the sum $AS3_{SUM}$ are obtained from the analysis signal AS3. Similarly, the maximum $AS100_{MAX}$, the minimum $AS100_{MIN}$, the median $AS100_{MED}$, the mean $AS100_{MEAN}$, the standard deviation $AS100_{STD}$ and the sum $AS100_{SUM}$ are obtained from the analysis signal AS100.

Figure 9:
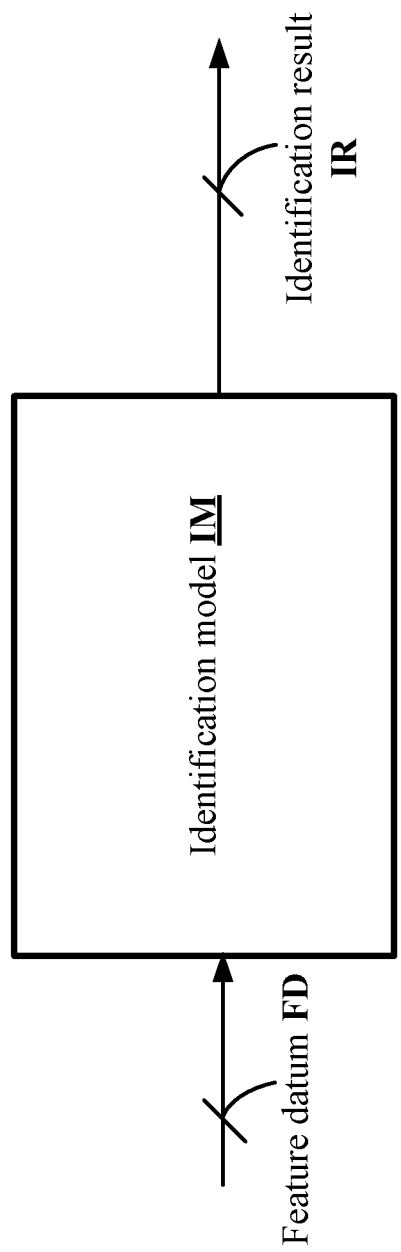
FIG. 9 depicts that the networking behavior detector 1 inputs the feature datum FD into an identification model IM to produce an identification result IR.

Subsequently, the networking behavior detector 1 inputs the feature datum FD into an identification model IM, and analyzes the feature datum AD through the identification model IM to generate an identification result IR, as shown in FIG. 9. The identification result IR corresponds to one of a plurality of networking behaviors. The networking behavior may be the aforementioned video transmission, photo transmission, reception of online videos, or any possible transmission behavior. Therefore, based on the identification result IR, the networking behavior detector 1 can discover the forbidden wireless networking behavior immediately, and can timely send an alarm or a notification message to the user equipment of the relevant person to further take appropriate actions to prevent leakage of information or data.

Figure 10A:
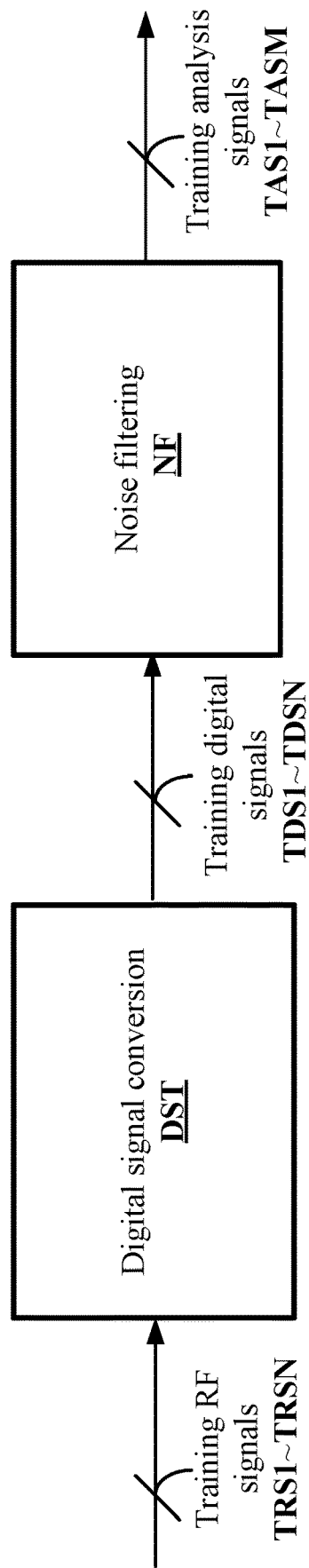
FIG. 10A and FIG. 10B depict the building of the identification model IM.
Figure 10B:
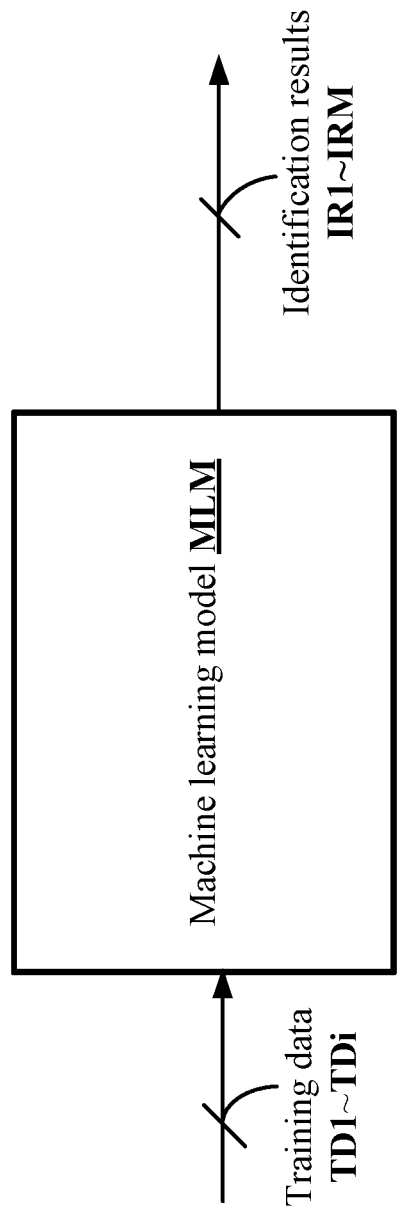

Please refer to FIG. 10A and FIG. 10B for the second embodiment of the present invention. This embodiment will explain the generation of the identification model IM of the first embodiment. First, the networking behavior detector 1 receives a plurality of training RF signals TRS1-TRSN in the indoor space IS, wherein N is a positive integer. The training RF signals TRS1-TRSN are generated by a user equipment when performing known networking behaviors (e.g., video transmission, photo transmission, reception of online videos, or any possible transmission behavior). In other words, the networking behavior detector 1 receives RF signals corresponding to known networking behaviors for subsequent generation of samples for training the machine learning model MLM.

Next, the networking behavior detector 1 converts the training RF signals TRS1-TRSN into a plurality of training digital signals TDS1-TDSN. Similarly, the networking behavior detector 1 calculates the energy value of each of the training digital signals TDS1-TDSN. Then, the networking behavior detector 1 performs noise filtering NF on the training digital signals TDS1-TDSN to filter out the training digital signal, of which the energy value is smaller than the threshold, among the training digital signals TDS1-TDSN to generate a plurality of training analysis signals TAS1-TASM, wherein M is a positive integer and is less than N.

Similarly, the networking behavior detector 1 may perform noise filtering NF on W training digital signals in batches based on the sliding window SW (e.g., 1 ms), i.e., perform noise filtering NF on the first training digital signal to the Wth training digital signal, then perform noise filtering NF on the (W+1)th training digital signal to the (2W)th training digital signal, and so on, until 100 training analysis signals TAS1-TAS100 are collected. Therefore, the networking behavior detector 1 retrieves the energy feature values (e.g., the maximum, the minimum, the median, the mean, the standard deviation, and the sum) of each of the 100 training analysis signals TAS1-TAS100 currently collected to generate a training datum TD1.

Next, the networking behavior detector 1 collects the next 100 training analysis signals TAS101-TAS200, and retrieves the energy feature values of each of the training analysis signals TAS101-TAS200 to generate another training datum TD2. Similarly, the networking behavior detector 1 may generate a plurality of training data TD1-TDi, wherein i is a positive integer and is determined depending on the number of training data actually required. In other words, when the number of the training analysis signals accumulates to a preset number (e.g., 100), the networking behavior detector 1 retrieves the energy feature values from each of the preset number of training analysis signals as a training data (i.e., one of the training data TD1-TDi).

In response to receiving the training RF signals TRS1-TRSN corresponding to different known networking behaviors, the networking behavior detector 1 may generate the training data TD1-TDi corresponding to different known networking behaviors. Subsequently, the networking behavior detector 1 inputs the training data TD1-TDi into the machine learning model MLM to generate a plurality of identification results IR1-IRM, thereby training the machine learning model MLM. In this embodiment, the machine learning model may be a Convolutional Neural Network (CNN) model (but not limited thereto), and the training mode may be supervised (but not limited thereto). Finally, based on the trained machine learning model MLM, the networking behavior detector 1 generates the identification model IM. In other words, the machine learning model MLM trained in the above manner may be used as the identification model IM of the present invention to detect the forbidden wireless networking behavior, as described in the first embodiment.

Figure 11:
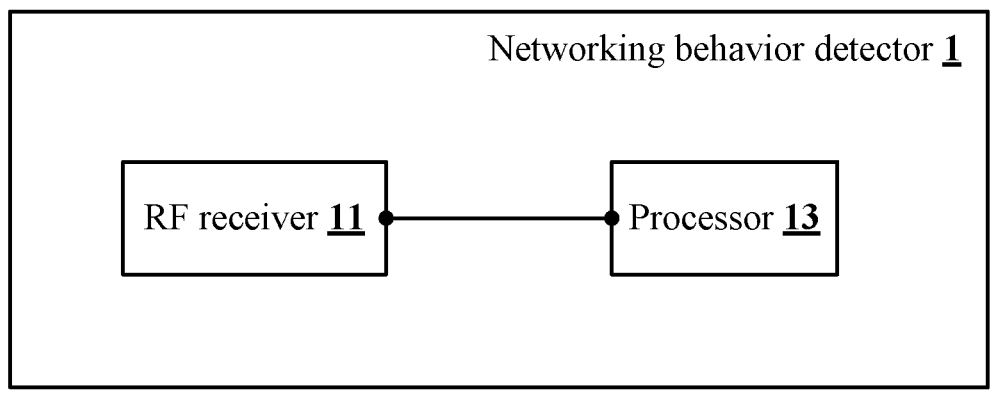
FIG. 11 is a schematic view of the networking behavior detector 1 according to the present invention.

A third embodiment of the present invention is as shown in FIG. 11, which is a schematic view of a networking behavior detector 1 for an indoor space according to the present invention. The networking behavior detector 1 comprises a RF receiver 11 and a processor 13. The processor 13 is electrically connected to the RF receiver 11. The networking behavior detector 1 may be implemented by the Software Defined Radio (SDR) hardware. For simplifying the description, other components of the networking behavior detector 1, such as a storage, a housing, a power module and other components that are less relevant to the present invention, are omitted from depiction in the drawings.

Corresponding to the first embodiment, the processor 13 receives a plurality of RF signals in the indoor space via the RF receiver 11. The RF signals may be received from a channel of a wireless local area network. Thereafter, the processor 13 converts the RF signals into a plurality of digital signals (as shown in FIG. 6A) and calculates an energy value of each digital signal. Next, the processor 13 filters out the digital signal, of which the energy value is smaller than a threshold, among the digital signals to generate a plurality of analysis signals (as shown in FIG. 7). The energy feature values of each analysis signal may include at least two of a maximum, a minimum, a median, a mean, a standard deviation, and a sum.

After generating the analysis signals, the processor 13 retrieves a plurality of energy feature values of each analysis signal to generate a feature datum (as shown in FIG. 8). Subsequently, the processor 13 analyzes the feature datum through an identification model to generate an identification result (as shown in FIG. 9). As described previously, the identification result may correspond to one of a plurality of networking behaviors.

In an embodiment, the processor 13 may filter out the digital signal, of which the energy value is smaller than the threshold, among the digital signals based on a sliding window (as shown in FIG. 7).

In an embodiment, the space size of the indoor space may be associated with the threshold.

In an embodiment, the processor 13 filters out the digital signal, of which the energy value is smaller than the threshold, among the digital signals to obtain a preset number of the analysis signals. The preset number may be 100 as exemplified in the first embodiment.

In an embodiment, the energy value of each digital signal may be an energy average over a plurality of subcarriers.

Corresponding to the second embodiment, the identification model is generated based on the processor 13 performing the following operations: receiving a plurality of training RF signals in the indoor space through the RF receiver 11; converting the training RF signals into a plurality of training digital signals; calculating the energy value of each of the training digital signals; filtering out a training digital signal, of which the energy value is less than the threshold, among the training digital signals to generate a plurality of training analysis signals; retrieving a plurality of training data from the training analysis signals, wherein when the number of the training analysis signals accumulates to a preset number, the energy feature values of each of the preset number of the training analysis signals are retrieved as one of the training data; inputting the training data into a machine learning model to train the machine learning model; and generating the identification model based on the trained machine learning model.

In an embodiment, the machine learning model may be a Convolutional Neural Network (CNN) model.

Figure 12:
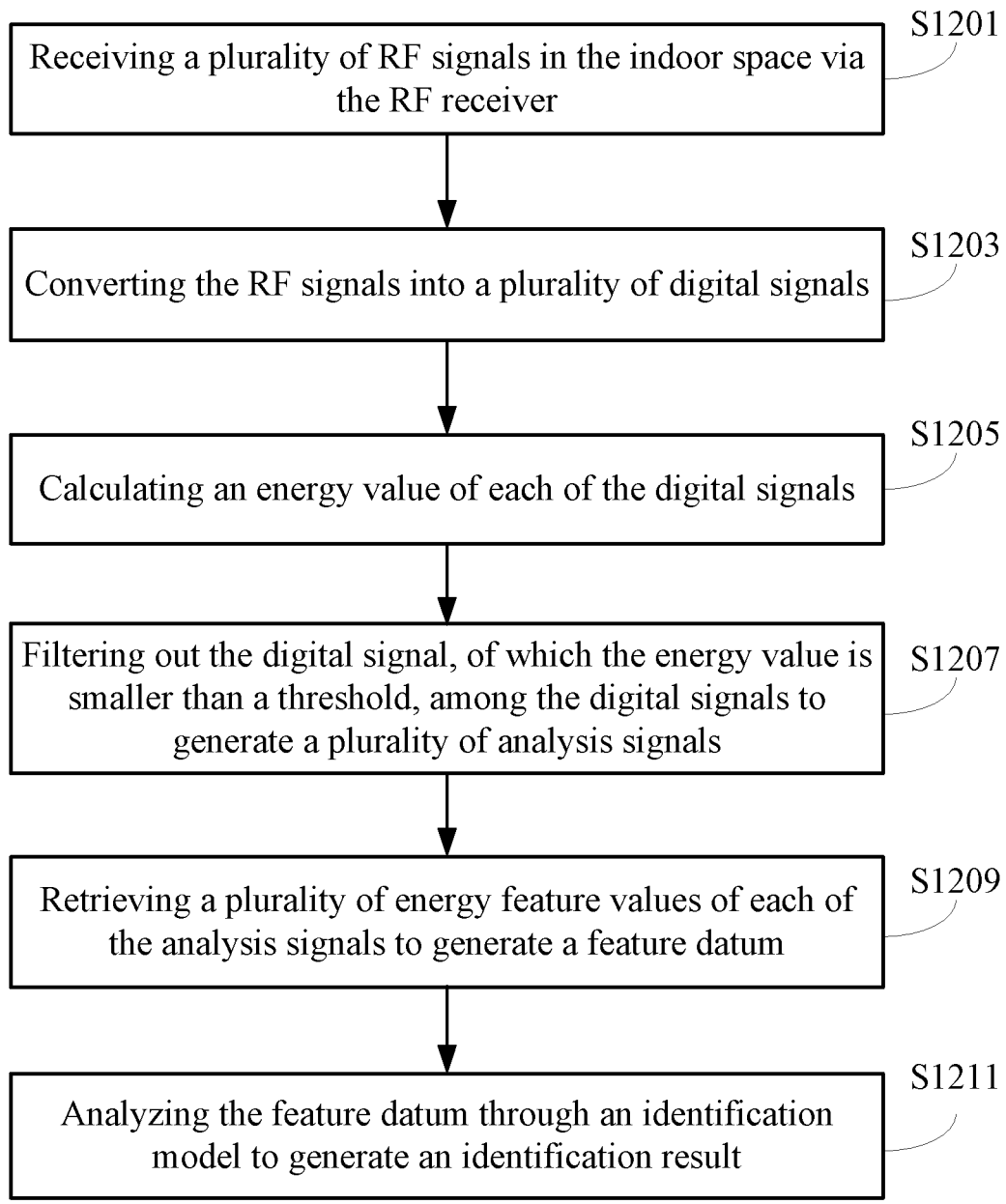
FIG. 12 is a flowchart diagram of a networking behavior detection method according to the present invention.

A fourth embodiment of the present invention depicts a networking behavior detection method, and a flowchart diagram thereof is as shown in FIG. 12. The networking behavior detection method is adapted for use in a networking behavior detector (e.g., the networking behavior detector 1 of the previous embodiments). The networking behavior detector may be installed in an indoor space and comprises a RF receiver and a processor. The networking behavior detection method is executed by the processor, and steps included therein are described as follows.

First, in step S1201, a plurality of RF signals in the indoor space are received via the RF receiver. In step S1203, the RF signals are converted into a plurality of digital signals. Next, in step S1205, an energy value of each of the digital signals is calculated; and in step S1207, a digital signal, of which the energy value is smaller than a threshold, among the digital signals is filtered out to generate a plurality of analysis signals.

Thereafter, in step S1209, a plurality of energy feature values of each of the analysis signals are retrieved to generate a feature datum. Finally, in step S1211, the feature datum is analyzed through an identification model to generate an identification result. As described previously, the identification result may correspond to one of a plurality of networking behaviors.

In an embodiment, the RF signals are received from a channel of a wireless local area network.

In an embodiment, the energy feature values of each of the analysis signals include at least two of a maximum, a minimum, a median, a mean, a standard deviation, and a sum.

In an embodiment, the networking behavior detection method of the present invention further comprises the following step: filtering out the digital signal, of which the energy value is smaller than the threshold, among the digital signals based on a sliding window.

In an embodiment, a space size of the indoor space is associated with the threshold.

In an embodiment, the networking behavior detection method of the present invention further comprises the following step: filtering out the digital signal, of which the energy value is smaller than the threshold, among the digital signals to obtain a preset number of the analysis signals.

In an embodiment, the energy value of each of the digital signals is an energy average over a plurality of subcarriers.

In an embodiment, the identification model of the present invention is generated based on the following steps: receiving a plurality of training RF signals in the indoor space through the RF receiver; converting the training RF signals into a plurality of training digital signals; calculating the energy value of each of the training digital signals; filtering out a training digital signal, of which the energy value is smaller than the threshold, among the training digital signals to generate a plurality of training analysis signals; retrieving a plurality of training data from the training analysis signals, wherein when the number of the training analysis signals accumulates to a preset number, the energy feature values of each of the preset number of the training analysis signals are retrieved as one of the training data; inputting the training data into a machine learning model to train the machine learning model; and generating the identification model based on the trained machine learning model.

In an embodiment, the machine learning model is a Convolutional Neural Network (CNN) model.

In addition to the aforesaid steps, the networking behavior detection method of the present invention can also execute all the operations and have the corresponding functions set forth in all the above embodiments. How this embodiment executes these operations and has these functions shall be readily appreciated by those of ordinary skill in the art based on the explanation of all the above embodiments, and thus will not be further described herein.

According to the above descriptions, the present invention can discover a forbidden wireless networking behavior immediately by analyzing RF signals in an indoor space to detect whether there is a forbidden wireless networking behavior, thereby further taking appropriate actions to prevent leakage of information or data.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A networking behavior detector for an indoor space, comprising:
   a radio frequency (RF) receiver; and
   a processor, being electrically connected to the RF receiver, and being configured to perform the following operations:
      receiving a plurality of radio frequency (RF) signals in the indoor space via the RF receiver;
      converting the RF signals into a plurality of digital signals;
      calculating an energy value of each of the digital signals;
      filtering out the digital signal, of which the energy value is smaller than a threshold, among the digital signals to generate a plurality of analysis signals;
      retrieving a plurality of energy feature values of each of the analysis signals to generate a feature datum; and
      analyzing the feature datum through an identification model to generate an identification result, wherein the identification result corresponds to one of a plurality of networking behaviors.

2. The networking behavior detector of claim 1, wherein the RF signals are received from a channel of a wireless local area network.

3. The networking behavior detector of claim 1, wherein the energy feature values of each of the analysis signals include at least two of a maximum, a minimum, a median, a mean, a standard deviation, and a sum.

4. The networking behavior detector of claim 1, wherein the processor filters out the digital signal, of which the energy value is smaller than the threshold, among the digital signals based on a sliding window.

5. The networking behavior detector of claim 1, wherein a space size of the indoor space is associated with the threshold.

6. The networking behavior detector of claim 1, wherein the processor filters out the digital signal, of which the energy value is smaller than the threshold, among the digital signals to obtain a preset number of the analysis signals.

7. The networking behavior detector of claim 1, wherein the energy value of each of the digital signals is an energy average over a plurality of subcarriers.

8. The networking behavior detector of claim 1, wherein the identification model is generated based on the processor performing the following operations:
   receiving a plurality of training RF signals in the indoor space via the RF receiver;
   converting the training RF signals into a plurality of training digital signals;
   calculating the energy value of each of the training digital signals;
   filtering out the training digital signal, of which the energy value is smaller than the threshold, among the training digital signals to generate a plurality of training analysis signals;
   retrieving a plurality of training data from the training analysis signals, wherein when the number of the training analysis signals accumulates to a preset number, the energy feature values of each of the preset number of the training analysis signals are retrieved as one of the training data;
   inputting the training data into a machine learning model to train the machine learning model; and
   generating the identification model based on the trained machine learning model.

9. The networking behavior detector of claim 8, wherein the machine learning model is a Convolutional Neural Network (CNN) model.

10. A networking behavior detection method for a networking behavior detector, the networking behavior detector being installed in an indoor space, the networking behavior detector comprising a radio frequency (RF) receiver and a processor, the networking behavior detection method being executed by the processor and comprising:
    receiving a plurality of radio frequency (RF) signals in the indoor space via the RF receiver;
    converting the RF signals into a plurality of digital signals;
    calculating an energy value of each of the digital signals;
    filtering out the digital signal, of which the energy value is smaller than a threshold, among the digital signals to generate a plurality of analysis signals;
    retrieving a plurality of energy feature values of each of the analysis signals to generate a feature datum; and
    analyzing the feature datum through an identification model to generate an identification result, wherein the identification result corresponds to one of a plurality of networking behaviors.

11. The networking behavior detection method of claim 10, wherein the RF signals are received from a channel of a wireless local area network.

12. The networking behavior detection method of claim 10, wherein the energy feature values of each of the analysis signals include at least two of a maximum, a minimum, a median, a mean, a standard deviation, and a sum.

13. The networking behavior detection method of claim 10, further comprising:
    filtering out the digital signal, of which the energy value is smaller than the threshold, among the digital signals based on a sliding window.

14. The networking behavior detection method of claim 10, wherein a space size of the indoor space is associated with the threshold.

15. The networking behavior detection method of claim 10, further comprising:
    filtering out the digital signal, of which the energy value is smaller than the threshold, among the digital signals to obtain a preset number of the analysis signals.

16. The networking behavior detection method of claim 10, wherein the energy value of each of the digital signals is an energy average over a plurality of subcarriers.

17. The networking behavior detection method of claim 10, wherein the identification model is generated based on steps comprising:
    receiving a plurality of training RF signals in the indoor space via the RF receiver;
    converting the training RF signals into a plurality of training digital signals;
    calculating the energy value of each of the training digital signals;
    filtering out the training digital signal, of which the energy value is smaller than the threshold, among the training digital signals to generate a plurality of training analysis signals;
    retrieving a plurality of training data from the training analysis signals, wherein when the number of the training analysis signals accumulates to a preset number, the energy feature values of each of the preset number of the training analysis signals are retrieved as one of the training data;
    inputting the training data into a machine learning model to train the machine learning model; and generating the identification model based on the trained machine learning model.

18. The networking behavior detection method of claim 17, wherein the machine learning model is a Convolutional Neural Network (CNN) model.

\* \* \* \* \*